United States Patent [19]

Fry

[11] 3,821,436

[45] June 28, 1974

[54] FOOD-FLAVOR-COMPOSITION

[75] Inventor: William Grant Fry, Worthington, Ohio

[73] Assignee: Abbott Laboratories, North Chicago, Ill.

[22] Filed: Aug. 2, 1973

[21] Appl. No.: 385,021

Related U.S. Application Data

[63] Continuation-in-part of Ser. No. 164,455, July 20, 1971, abandoned.

[52] U.S. Cl. .................. 426/213, 426/221, 426/141
[51] Int. Cl. .............................................. A23l 1/26
[58] Field of Search ........... 426/213, 215, 221, 312, 426/175, 65; 127/29, 30, 32

[56] References Cited
UNITED STATES PATENTS

| | | | |
|---|---|---|---|
| 3,041,180 | 6/1962 | Swisher | 426/181 |
| 3,385,354 | 11/1961 | Bevarly | 165/94 |
| 3,560,343 | 2/1971 | Armbruster et al. | 426/215 |

Primary Examiner—Raymond N. Jones
Assistant Examiner—E. L. Massung
Attorney, Agent, or Firm—Robert L. Niblack; James L. Bailey

[57] ABSTRACT

A food composition useful as a flavorant comprising a free-flowing, non-hygroscopic, water-soluble powder consisting of in combination a starch hydrolysate, preferably having a D. E. less than about 40, and at least one flavoring agent. Said food composition may also contain an anti-caking agent such as silica, a fat source and a protein source as well as other ingredients such as an edible emulsifier and a coloring agent.

7 Claims, No Drawings

FOOD-FLAVOR-COMPOSITION

REFERENCE TO RELATED APPLICATIONS

This application is a continuation-in-part of copending application bearing Ser. No. 164,455, filed July 20, 1971, now abandoned.

BACKGROUND OF THE INVENTION

1. Field of the Invention

The present invention relates to a powdered food product used to convey a variety of flavors to such foods as eggs, meats, etc. The free-flowing, non-hygroscopic, water-soluble flavorant is adaptable for use in both hot and cold foods and conveys an authentic flavor to said foods.

2. Description of the Prior Art

In the past powdered flavorants have been somewhat dificient for one reason or another. In some instances, the products gradually lost the desired property of free-flow. Normally, this was due to the fact that the flavorant was somewhat hygroscopic, and gradually it agglomerated to an undesirable size. In other cases, the flavorant did not possess the property of ready water solubility in both hot and cold media. In yet other instances the powdered flavoring agent did not in actuality convey an authentic flavoring to the food being so treated. In some products the flavorant carrier also tended to impart an undesirable flavor to the food such as sweetness.

It would therefore be a substantial advance in the art if a powdered flavorant were found which was free-flowing, non-hygroscopic and easily water-soluble in both hot and cold liquids. It would be a further benefit if the powdered flavorant could be used to convey a variety of flavors to foods, depending upon the artificial or natural flavoring agent used, and would be added to a host of various foods.

SUMMARY OF THE INVENTION

In accordance with the above, a novel flavorant composition has been discovered which is useful in a wide variety of foods. The food composition broadly comprises a free-flowing, non-hydroscopic, water-soluble powder consisting of in intimate combination a starch hydrolysate having a D. E. less than about 40, and at least one flavoring agent. The starch hydrolysate preferably has a D. E. ranging from about 5 to about 40, and most preferably ranges from about 5 to about 20. The flavoring agent itself can be chosen from a wide variety of flavorants, both of the artificial and natural type. Representative flavoring agents are bacon, mushroom and green pepper. The powdered flavorant here has excellent bulk density, normally ranging between 30 grams/100 cc. and 50 grams/100 cc.

DESCRIPTION OF THE PREFERRED EMBODIMENTS

The low D. E. starch hydrolysate material used as a carrier for the flavoring agent is made by subjecting a source of starch to enzyme or acid treatment or a combination of both treatments. It is important that the starch hydrolysates have a relatively low D. E. (dextrose equivalent) of less than about 40, and most preferably has a D. E. range of 5–40. A typical low D. E. starch hydrolysate will have a D. E. ranging between about 5 and about 20. Such materials are bland and do not impart any sweetness to the flavorant composition.

The term D. E. (dextrose equivalent) is used herein to refer to the reducing sugars content of the dissolved solids in a starch hydrolysate expressed as dextrose as measured by the Luff-School Method (NBS Circular C-440, page 195 as appearing in "Polarimetry, Saccharimetry and the Sugars." Authors: Frederick J. Bates and Assoc.)

The initial starch which is subjected to hydrolytic treatment may be derived from a variety of starch material such as corn, potatoes, tapioca, grain sorghum, etc. Waxy starches may also be employed and the term "starch hydrolysate" as used herein encompasses hydrolyzed starch materials derived from a wide variety of starch sources known in the industry.

The flavoring agent combined in an intimate admixture with the low D. E. starch hydrolysate base may be chosen from a wide variety of known flavorants. Typical varieties of artificial and natural flavoring agents include mushroom, green pepper, bacon, sour cream, beef, cheese, tomato, garlic butter, lemon butter, coconut butter, coffee oil, peppermint oil, spearmint oil, strawberry, raspberry, etc. flavors. Of course, two or more flavoring agents may be present such as the combination of an artificial and natural flavoring agents.

In the usual case, the food composition will contain from about 70 to about 95 percent by weight of the low D. E. starch hydrolysate and from about 3 to about 20 percent by weight of a flavoring agent. In a greatly preferred embodiment an anti-caking or flow-promoting agent is also employed. The anti-caking agent is normally present in the compositions here in an amount ranging from about 0.1 percent by weight to about 1 percent by weight based on the total weight of the flavoring composition.

The silica anti-caking agent may be chosen from a wide variety of well-known forms of silica. For example, a precipitated silica may be used, as for example, one prepared by peptizing a colloidal silica sol. Other suitable silicas include silica aerogels. These are silicas which are colloidal in nature and are generally prepared by replacing the water of a silica hydrogel with a low boiling organic liquid, immiscible in water, followed by heating the resulting product in an autoclave above the critical temperature of the liquid. Another silica is a fume silica. This is a silica capable of being put into colloidal form, which is obtained by burning silicon tetrachloride and collecting the resulting silica smoke. A similar product may be obtained by burning a tetraortho silicate at extremely high temperatures. Still other anti-caking agents include cyclic siloxanes such as dialkyl substituted cyclic siloxanes composed of 4–16 membered rings interrupted by at least one siloxane bonded dense silica particle. Preferred anti-caking agents are silica ($SiO_2$) itself and sodium silico aluminate.

In any event, any agent can be used as an anti-caking agent which acts to prevent undue agglomeration of the intimate particles of low D. E. starch hydrolysate and flavoring agent.

Additional ingredients may also be present in the flavorant compositions of the invention such as a fat source including butter fat, tallow, hydrogenated tallow, palm oil, coconut oil, cotton seed oil and the like. The fat, when present, normally comprises from about 5 to about 40 percent by weight of the composition.

When a fat is added to the compositions here normally an emulsifier is also present. Usually the emulsifier will comprise from about 0.1 to about 1.0 percent by weight of the total flavorant composition weight. Typical emulsifiers include the partial fatty acid esters of polyhydric alcohols containing at least one polyoxyethylene chain, complete fatty esters of the condensation products of polyhydric alcohols and ethylene oxide, partial fatty acid esters of polyoxyethylene glycol, complete fatty acid esters of polyoxyethylene glycol, partial fatty acid esters of polyoxyethylene sorbitan such as the polyoxyethylene (20) sorbitan monostearate. Still further exemplary emulsifiers include glyceryl esters, diacetyl tartaric acid esters, mono- and diglycerides of fat-forming fatty acids such as the diacetyl tartaric acid esters of mono and diglycerides of stearic and palmitic acids, soy bean lecithin, split lecithin, etc. Various mixtures and combinations with the above or other emulsifiers may also be used.

Still further additional ingredients which may be optionally present in the compositions here include a protein source such as non-fat milk solids, sodium or calcium caseinate, whey, proteins derived from soybeans and other food materials of this type. The protein may be present in an amount ranging from about 5 to about 20 percent by weight of the total composition weight.

Other optional additional ingredients include small amounts of stabilizers such as algin, sodium alginate, egg albumen, soya albumen, hydrated gelatin and refined hydrocolloids obtained from seed plants, mainly Irish moss or carrageen. Again, the compositions as described herein may also include vitamins, minerals, dyes, colorants, salt, citric acid, fumaric acid, lecithin, hydroxy lecithin, etc. If desired, the flavorant may also contain a sweetening agent such as dextrose or sucrose, though in the main sweetening agents tend to mask the desired taste of the flavorant present.

Flavor modifiers such as monosodium glutamate and ribotides can also be used.

The just described products may be used to convey a flavoring effect to a wide variety of foods including eggs, meats, casseroles, meat loaves, soups, salads, etc. The flavorant may be sprinkled on foods, mixed in with foods such as by spooning or applied to foods in any known manner.

It is important that the particle size of the powdered product be within a certain limit for reasons of proper flowability and easy dissolution. Normally at least 40 percent of the particles should be greater than a U.S. standard 40 mesh sieve.

The just described flavorants may be prepared in a number of ways, the following of which are typical.

In one embodiment the low D. E. starch hydrolysate and flavoring agent and other desired ingredients are mixed dry and then added to water to form a uniform dispersion. Alternatively, the ingredients may be added separately to water. Normally the solids content will range from about 45 percent to about 65 percent. It is desirable to have as high a solids content as possible to obtain proper ultimate particle size. However, beyond a certain maximum solid content, which figure will vary depending upon the flavorant, one cannot achieve proper atomization, and proper drying of the final product. The mixture is usually standardized to the desired solids content by passing the liquid containing dispersed ingredients through an inline refractometer.

The mixing of ingredients in water as the first step is normally effected at room temperature as heating tends to release flavoring volatiles.

Thereafter the liquid is then passed through a scraped-surface heat exchanger at, say, 180°–190° F. The system itself is closed and under pressure. In order to better achieve the proper bulk density a gas as carbon dioxide is thereafter injected under pressure. The carbon dioxide dissolves in the product and in the next step aids in drying and tends to puff up the final product.

The last step in the process here is a spray-drying procedure. If the solids content is properly controlled the final product has a bulk density ranging from about 30 grams/100 cc. to about 50 grams/100 cc. In a typical situation, the spray-drying will be carried out at a relatively low pressure of, say, 400–600 psi. The orifice of the spray-drying equipment, on the other hand, will be relatively large, say, 0.106 inch.

The following examples illustrate typical food compositions of the invention here, and their method of formation.

EXAMPLE I

BACON FLAVORING

The following ingredients were blended in 226 pounds of water; 467 pounds of hydrolyzed cereal solids (D. E. — 10), 75.8 pounds of bacon flavor, 55.0 pounds of sodium chloride, 2.2 pounds of sodium silico aluminate, 1.85 pounds of onion flavor, and 44 grams of hickory smoke flavor. These materials were blended in a Nauta Blender. The sodium chloride was first added to the water and the blender screw started. A portion of the cereal solids was then added followed by the addition of the bacon flavor, onion flavor and hickory smoke flavor. Thereafter the remainder of the cereal solids was added. The bath was standardized to a Goldberg Refractometer reading of 64.25–64.50 by slowly adding filtered water. The blend was maintained at a temperature of 68°–72° F. during the standardization.

The above product was then passed through a heat exchanger where it was heated to 175°–180° F. The product was then transferred through a high pressure pump and thereafter carbon dioxide was injected in the product under pressure. The product was then spray dried under the following conditions at a rate of 400–550 pounds of powder per hour; mix feed temperature — 160°–165° F., mix feed solids — 61.5–62.5 percent, ingoing air temperature 300°–305° F., outgoing air temperature 230°–240° F., powder temperature from drier — 180°–190° F., powder temperature from cooler — 80–100° F., and nozzle pressure — 400–550 psi.

EXAMPLE II

GREEN PEPPER FLAVORANT

Here 300 pounds of hydrolyzed cereal solids (D. E. — 10), 100 pounds of green pepper powder, 0.8 pounds of sodium silico aluminate and 100 grams of green pepper enhancer were blended to 400 pounds of water. A portion of the water was added to the Nauta Blender and the mixing screw started. Thereafter the cereal solids and green pepper powder were then added to the blender, followed by addition of the green pepper enhancer. The remainder of the water was then added.

After sufficient blending the product was then put through the heat exchange and spray-drying steps as outlined in Example I with the exception that the mix feed solids content in the spray-drying step here was 46–47 percent.

EXAMPLE III

MUSHROOM FLAVORANT

In this run 482 pounds of hydrolyzed cereal solids (D. E. — 10), 206 pounds of mushroom extract, 3.3 pounds of sodium silico aluminate, 2.75 pounds of mushroom flavor, 1.65 pounds of fried mushroom flavor and 2.75 grams of coloring agent were added to 110 pounds of water in the following manner. First, a small portion of the water was added to the blender and the agitator screw turned on. Thereafter the cereal solids were added to the blender. Then the mushroom extract and 100 pounds of water were added, followed by addition of the mushroom flavor, the fried mushroom flavor and the coloring agent. The batch was standardized to a Goldberg Refractometer reading of 63.5–64 by further addition of water at 45°–55° F. The blend was maintained at a temperature of 68°–72° F. during standardization.

The blend was then passed through a heat exchanger and a spray drier in the manner outlined in Example I.

As noted above, the particle size is important in order to get proper flowability and dissolvability. To demonstrate this, the following test procedure was followed. The green pepper powder of Example II was vibrated and sieved for five minutes through a 20, 40, 60, and 100 mesh U.S. Sieve. Samples of the powder retained on the 20, 40, 60, and 100 mesh screens and collected in the pans (through the 100 mesh screen) were tested for standard flowability and subjective dissolvability. The average results of the two timed flowabilities are given in Table I below.

Table I

| Particles Retained on U.S. Sieve | Timed Flowability in Seconds | Angle of Repose |
|---|---|---|
| 20 Mesh | 11 Sec. | 30° |
| 40 Mesh | 10 Sec. | 37° |
| 60 Mesh | 10.5 Sec. | 32° |
| 100 Mesh | 17 Sec. | 40° |
| Pan | 26 Sec. | 43° |

Dissolvability was then noted with respect to the various particle sizes shown in Table II.

Dissolvability, as measured here, combines the results of dispersibility, wettability, sinkability and solubility. Dispersibility is defined as the movement of particles outward and downward from the shape of a spoon of particles as they strike the liquid surface, resulting in an amorphous agglomerate of particles. Wettability is the ability of all the particles from a level teaspoon of powdered material to become visibly wet after being deposited into a beaker of liquid. Sinkability is the ability of all the particles of a level teaspoon to move beneath the surface of a liquid. Lastly, solubility is the ability of all the particles of a level teaspoon of powdered material to completely dissolve in a liquid to form an unsaturated solution.

In order to measure dissolvability, the following procedure was followed. The handle of one level teaspoon of powdered product was rested on the rim of a 200 ml. beaker filled with 100 ml. of 9°–10° C. water. The sppon was centered directly over the center of the water surface. A teaspoon of product was carefully overturned and, as soon as the product touches the surface of the water a stop watch was started in order to note the time it takes for all of the particles to become wet. Secondly, the time was noted that it takes for all of the particles to sink. Finally, the time was noted for all the particles to dissolve (solubility). To note solubility, one vigorous uniform stir was given.

Table II

| Particles Retained on U.S. Sieve | | Dissolvability in 9°C. Water |
|---|---|---|
| 20 Mesh | a. | Wetted immediately. |
| | b. | Sank in 10–15 sec. |
| | c. | 1 stir dissolved 75% |
| | d. | 2–10 stirs dissolved 80% |
| 40 Mesh | a. | Wetted immediately. |
| | b. | Would not sink even after 2 min. 30 sec. |
| | c. | 1 stir dissolved 95% |
| 60 Mesh | a. | Wetted immediately. |
| | b. | Would not sink — almost floated in shape of spoon. |
| | c. | 1–4 stirs left several small lumps. |
| | d. | 5–6 stirs dissolved 95% |
| 100 Mesh | a. | Took 4 sec. to wet. |
| | b. | Would not sink; took shape of spoon. |
| | c. | 1–5 stirs left a 40% lump. |
| | d. | 5–40 stirs still left several small lumps. |
| Pan | a. | Took shape of spoon and only the outside 50% would wet. |
| | b. | Would not sink. |
| | c. | 1–5 stirs left 85% of product in several lumps. |

Thus, it can be seen that as particle size decreases the time for outward and downward dispersibility decreases, thus resulting in less sufficient wettability, sinkability, dissolvability and flowability.

The flowability and dissolvability characteristics of the mushroom and bacon flavorants of the above examples were also tested according to the procedure outlined above. These results are given in Tables III and IV.

Table III

| Flowability | | | | | |
|---|---|---|---|---|---|
| A. Mushroom | 20 Mesh | 40 Mesh | 60 Mesh | 100 Mesh | Pan |
| Stand. Flow. Time (Sec.) | No Sample | 8.8 | 11.2 | 14.5 | 13.9 |
| Angle of Repose | | 33° | 33° | 40° | 41° |
| B. Bacon | | | | | |
| Stand. Flow. Time (Sec.) | 10.7 | 9.3 | 10.2 | 15.8 | 22.0 |
| Angle of Repose | 38.5° | 38° | 37.5° | 40° | 40.5° |

Table IV

Dissolvability

A. Mushroom
| | |
|---|---|
| 40 Mesh | Wetted immediately; most of the individual particles sank in 30 sec.; 50% had dissolved after 1 minute; 2 stirs dissolved remainder. |
| 60 Mesh | Wetted immediately; most of the individual particles sank in 30 sec.; 85% had dissolved after 1 minutes; 1 stir dissolved remainder. |
| 100 Mesh | Wetted in 1.5 sec.; dissolved completely in 30 sec. with a small amount of foam remaining on top. |
| Pan | Took shape of spoon and only 50% wetted and became gummy and stringy; the remainder was dry above the water level even after 5 min.; then 5–10 stirs dissolved 80% with 5–6 small globules remaining. |

B. Bacon
| | |
|---|---|
| 40 Mesh | Wetted immediately; individual particles sank slowly; 90% had dissolved after 1 min. |
| 60 Mesh | Wetted immediately; individual particles sank slowly; 100% dissolved after 1 min. |
| 100 Mesh | Wetted in 1 sec.; sank as a blob in 3 sec.; 95% dissolved after 1 min. |
| Pan | Wetted and sank as a blob in 2 sec.; 50% dissolved after 1 min.; 6 stirs dissolved remainder. |

As can be seen from the above the distribution of particle size of the powder compositions of the invention is important here, particularly to obtain proper flowability and dissolvability. The average particle size distribution of the products here is as follows:

```
40–50% above U.S. Standard 40 mesh sieve
30–40% above U.S. Standard 60 mesh sieve
10–15% above U.S. Standard 100 mesh sieve
 5–10% below a U.S. Standard 100 mesh sieve
```

I claim:

1. A food composition useful as a flavoring comprising a free-flowing, non-hygroscopic, water-soluble powder consisting of in combination 70–95 percent by weight of a starch hydrolysate having a D. E. less than 40 and 3–30 percent by weight of at least one flavoring agent, said powder having an average particle size distribution as follows: 40–50 percent above U.S. Standard 40 mesh sieve; 30–40 percent above U.S. Standard 60 mesh sieve; 10–15 percent above U.S. Standard 100 mesh sieve; and 5–10 percent below a U.S. Standard 100 mesh sieve.

2. The composition of claim 1 which also includes 0.1–1 percent by weight of an anti-caking agent.

3. The composition of claim 1 wherein said starch hydrolysate is a corn starch hydrolysate.

4. The composition of claim 1 wherein said starch hydrolysate has a D. E. ranging from about 5 to about 40.

5. The composition of claim 1 which comprises about 85 percent by weight of a corn starch hydrolysate having a D. E. less than about 20, about 4.6 percent by weight of a bacon flavorant, about 10 percent by weight of sodium chloride, and about 0.4 percent by weight of an anti-caking agent.

6. The composition of claim 1 which comprises about 75 percent by weight of a corn starch hydrolysate having a D. E. less than about 20, about 25 percent by weight of a green pepper flavorant, and about 0.2 percent by weight of an anti-caking agent.

7. The composition of claim 1 which comprises about 88 percent by weight of a starch hydrolysate having a D. E. less than about 20, about 11 percent by weight of a mushroom flavorant, about 0.6 percent by weight of a anti-caking agent, and about 0.1 percent by weight of a coloring agent.

* * * * *